(12) United States Patent
Dowlatkhah et al.

(10) Patent No.: US 10,506,445 B2
(45) Date of Patent: Dec. 10, 2019

(54) RADIO ACCESS RESOURCE SHARING AND INTELLIGENT DYNAMIC CARRIER CAPACITY DIVISION IN 5G OR OTHER NEXT GENERATION NETWORKS

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 25 days.

(21) Appl. No.: 15/828,775

(22) Filed: Dec. 1, 2017

(65) Prior Publication Data
US 2019/0174324 A1    Jun. 6, 2019

(51) Int. Cl.
*H04W 16/14*        (2009.01)
*H04W 16/10*        (2009.01)

(52) U.S. Cl.
CPC ........... *H04W 16/14* (2013.01); *H04W 16/10* (2013.01)

(58) Field of Classification Search
CPC .............................. H04W 16/14; H04W 16/10
See application file for complete search history.

(56) References Cited

U.S. PATENT DOCUMENTS

| 7,643,794 | B2 | 1/2010 | Ofek et al. |
| 8,380,204 | B2 | 2/2013 | Choi et al. |
| 8,391,238 | B2 | 3/2013 | Rune et al. |
| 8,711,721 | B2 | 4/2014 | Smith et al. |
| 8,811,201 | B2 | 8/2014 | Sachs et al. |
| 9,083,775 | B2 | 7/2015 | Gupta |

(Continued)

FOREIGN PATENT DOCUMENTS

| CN | 1567769 A | 1/2005 |
| EP | 2698017 B1 | 12/2015 |

(Continued)

OTHER PUBLICATIONS

Samdanis, et al., "From Network Sharing to Multi-tenancy: The 5G Network Slice Broker," IEEE Communications Magazine, 2016, pp. 32-39, vol. 54, No. 7, 11 pages.

(Continued)

*Primary Examiner* — Brian D Nguyen
(74) *Attorney, Agent, or Firm* — Amin, Turocy & Watson, LLP

(57) ABSTRACT

Facilitating radio access resource sharing and intelligent dynamic carrier capacity division is provided herein. A system comprises a processor and a memory that stores executable instructions that, when executed by the processor, facilitate performance of operations that can comprise designating first portions of a radio resource to a first radio network device and second portions of the radio resource to a second radio network device. The operations can also comprise indicating in a header of a physical layer section of the radio resource that the first portions are for the first radio network device and that the second portions of the radio resource are for the second radio network device. Further, the operations can comprise transmitting the radio resource to the first radio network device and the second radio network device.

20 Claims, 10 Drawing Sheets

(56) References Cited

U.S. PATENT DOCUMENTS

| | | | |
|---|---|---|---|
| 9,088,989 | B2 | 7/2015 | Smith et al. |
| 9,210,649 | B2 | 12/2015 | Tervonen et al. |
| 9,224,169 | B2 | 12/2015 | Smith et al. |
| 9,226,194 | B2 | 12/2015 | Choi et al. |
| 9,462,574 | B2 | 10/2016 | Smith et al. |
| 9,706,545 | B2 | 7/2017 | Touag et al. |
| 2006/0126623 | A1* | 6/2006 | Huo .................... H04W 72/042 370/389 |
| 2010/0265893 | A1 | 10/2010 | Dwyer et al. |
| 2013/0003697 | A1 | 1/2013 | Adjakple et al. |
| 2013/0188576 | A1* | 7/2013 | Chao ...................... H04L 47/00 370/329 |
| 2013/0315182 | A1* | 11/2013 | Kitou ................ H04W 72/1289 370/329 |
| 2014/0269593 | A1* | 9/2014 | Wang .................... H04W 72/12 370/329 |
| 2014/0355567 | A1 | 12/2014 | Irmer et al. |
| 2015/0333813 | A1* | 11/2015 | Liu .................. H04W 72/1247 370/329 |
| 2017/0223739 | A1 | 8/2017 | Mallik et al. |
| 2018/0027538 | A1* | 1/2018 | Uchiyama ............. H04W 76/14 370/329 |
| 2018/0191422 | A1* | 7/2018 | Xia ...................... H04B 7/0834 |

FOREIGN PATENT DOCUMENTS

| | | |
|---|---|---|
| EP | 3057368 A1 | 6/2017 |
| JP | 2012029259 A | 2/2012 |
| KR | 20130015529 A | 2/2013 |
| WO | 2016186867 A1 | 11/2016 |

OTHER PUBLICATIONS

Xu, et al., "Interworking of Wimax and 3GPP Networks based on IMS," IP Multimedia Systems (IMS) Infrastructure and Services, IEEE Communications Magazine, Mar. 2007, pp. 144-150, vol. 45, No. 3, IEEE, 7 pages.

Salkintzis, et al., "Interworking Techniques and Architectures for WLAN/3G Integration Toward 4G Mobile Data Networks," IEEE Wireless Communications, Jun. 2004, pp. 50-61, vol. 11, No. 3, IEEE, 12 pages.

Gazis, et al., Toward a Generic 'Always Best Connected' Capability in Integrated WLAN/UMTS Cellular Mobile Networks (and Beyond), IEEE Wireless Communications, Jun. 2005, pp. 20-29, vol. 12, No. 3, IEEE, 10 pages.

Ksentini, et al., "Toward Enforcing Network Slicing on RAN: Flexibility and Resources Abstraction," IEEE Communications Magazine, 2017, pp. 102-108, vol. 55, No. 6, 11 pages.

* cited by examiner

RADIO ACCESS RESOURCE SHARING AND INTELLIGENT DYNAMIC CARRIER CAPACITY DIVISION IN 5G OR OTHER NEXT GENERATION NETWORKS

TECHNICAL FIELD

The subject disclosure relates generally to radio access resource sharing, and for example, to radio access resource sharing and intelligent dynamic carrier capacity division in 5G or other next generation networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
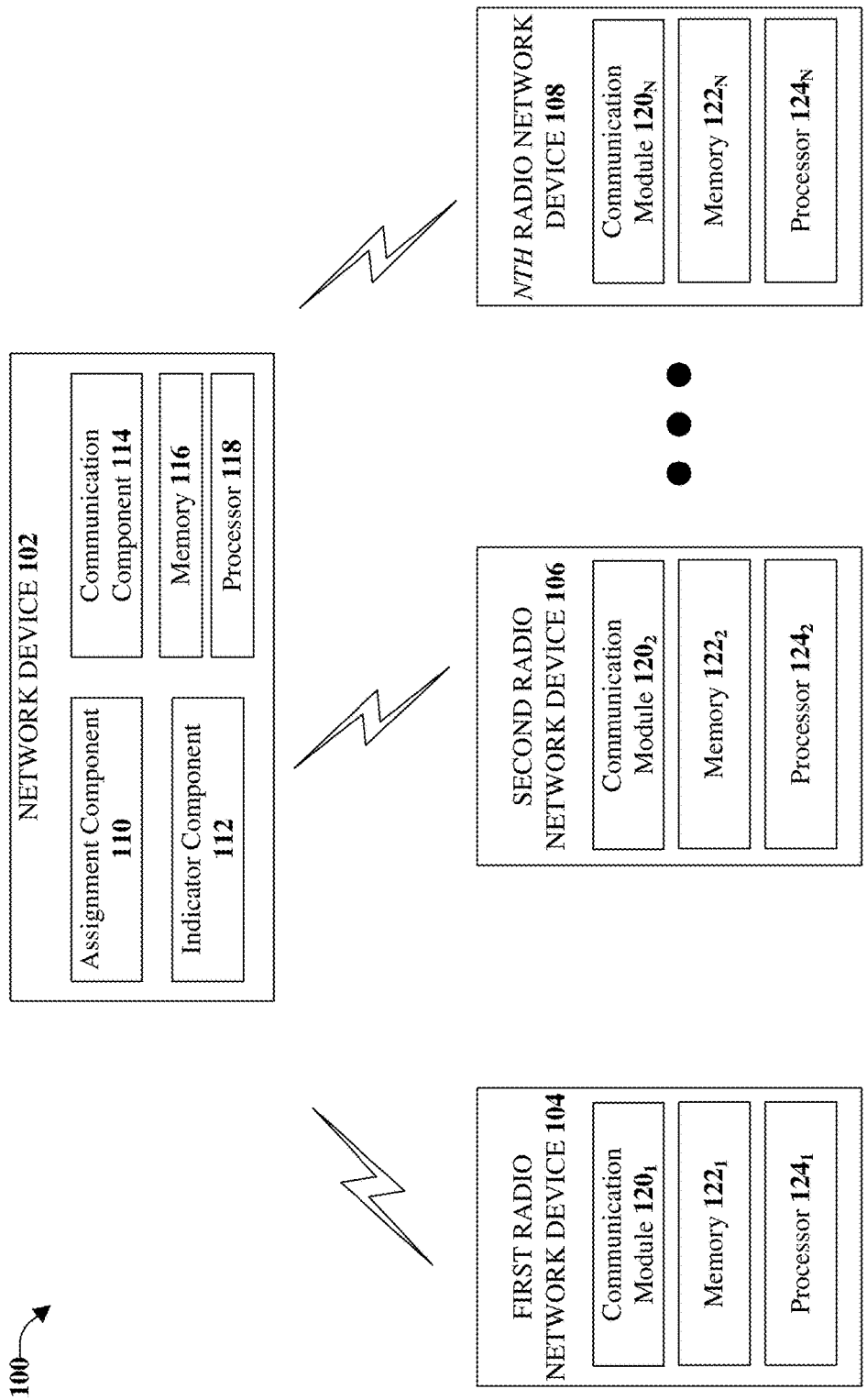
FIG. 1 illustrates an example, non-limiting, system for facilitating radio access resource sharing and intelligent dynamic carrier capacity division in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that relate to facilitating radio access resource sharing and intelligent dynamic carrier capacity division in 5G or other next generation networks. For example, the various aspects relate to the ability to divide the radio resources and to assign one or more segments of the radio resources to one or more carriers or mobile networks (e.g., Public Land Mobile Networks (PLMNs)). In addition, the various aspects can dynamically control the percentage of resources used by the one or more carriers or mobile networks. Through dynamic control of the amount of resources assigned per carrier (or per slice), efficiency of resource management and intelligent control in an emergency and/or the number of resources used by premium services can be achieved. Further, the various aspects can allow the ability of a resource provider to control its services end to end with dependency in a carrier core network. The various aspects can also mitigate a net neutrality issue by having a direct control of packages generated by a consuming entity and through the network to a service providers network.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or LTE, or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

In one embodiment, described herein is a system that comprises a processor and a memory that stores executable instructions that, when executed by the processor, facilitate performance of operations. The operations can comprise designating first portions of a radio resource to a first radio network device and second portions of the radio resource to a second radio network device. The radio resource can comprise a physical layer section and a medium access layer section. The operations can also comprise indicating in a header of the physical layer section that the first portions are for the first radio network device and that the second portions of the radio resource are for the second radio network device. Further, the operations can comprise transmitting the radio resource to the first radio network device and the second radio network device. The first radio network device can receive the first portions and does not receive the second portions. Further, the second radio network device can receive the second portions and does not receive the first portions.

In an example, designating the first portions and the second portions can comprise, based on a function, scaling a first quantity of first portions to the first radio network device and a second quantity of second portions to the second radio network device. Further to this example, scaling the first quantity of first portions can comprise increasing the first quantity of first portions designated for the first radio network device based on a determination that the first radio network device has priority over the second radio network device. Additionally, the operations further can comprise decreasing the second quantity of second portions designated for the second radio network device based on the determination that the first radio network device has priority over the second radio network device.

In another example, the first portions and the second portions of the radio resource can comprise medium access layer information. According to another example, the operations can comprise diverting the first portions to the first radio network device and the second portions to the second radio network device based on a reading of the header of the physical layer section.

In accordance with another example, the first radio network device can be associated with a first public land mobile network and the second radio network device can be associated with a second public land mobile network. Further to this example, the first public land mobile network and the second public land mobile network can use common radio resources to provide wireless connectivity to subscribers of the first public land mobile network and the second public land mobile network.

Designating the first portions and the second portions of the radio resource can comprise facilitating physical radio resource sharing in a wireless communications system according to an example. According to another example, transmitting the radio resource to the first radio network device and the second radio network device can comprise transmitting the radio resource according to a fifth generation wireless network communication protocol.

Another embodiment is a method that can comprise assigning, by a system comprising a processor, a first group of medium access layer information segments to a first network device and a second group of medium access layer information segments to a second network device. A radio resource can comprise the first group of medium access layer information segments, the second group of medium access layer information segments, and a physical layer. The method can also comprise updating, by the system, a header of the physical layer to indicate first segments in the first group of medium access layer information segments are for the first network device and second segments in the second group of medium access layer information segments are for the second network device. Further, the method can comprise facilitating, by the system, a transmission of the radio resource to the first network device and the second network device. The transmission can comprise the first group of medium access layer information segments, the second group of medium access layer information segments, and the physical layer.

In an example, updating the header of the physical layer can comprise rendering the first group of medium access layer information segments decodable by the first network device and the second group of medium access layer information segments decodable by the second network device.

According to an example, a first number of segments in the first group of medium access layer information segments and a second number of segments in the second group of medium access layer information segments can be changeable based on parameters associated with the first network device and the second network device.

In an example, the method can also comprise determining, by the system, additional segments of the medium access layer information segments are to be assigned to the first network device. The method can also comprise, based on a current evaluation of a function, allocating, by the system, the additional segments of the medium access layer information segments to the first network device. Further to this example, allocating the additional segments can comprise updating the header of the physical layer to indicate the additional segments are for the first network device.

According to another example, assigning the first group of medium access layer information segments and the second group of medium access layer information segments can comprise facilitating dynamic physical radio resource sharing in a wireless communications system. In accordance with another example, facilitating the transmission can comprise facilitating the transmission of the radio resource in accordance with a fifth generation wireless network communication protocol.

According to yet another embodiment, described herein is a machine-readable storage medium comprising executable instructions that, when executed by a processor, facilitate performance of operations. The operations can comprise allocating first radio resource information portions of a radio resource to a first network device and second radio resource information portions of the radio resource to a second network device. The operations can also comprise causing the first radio resource information portions and the second radio resource information portions to be transmitted to the first network device and the second network device. Information related to a first allocation of the first radio resource information portions and a second allocation of the second radio resource information portions can be included in a header portion of a physical layer of the radio resource.

According to an example, the first network device and the second network device can be associated with respective mobile virtual network operator networks. Further, causing the first radio resource information portions and the second radio resource information portions to be transmitted can comprise causing the first radio resource information portions and the second radio resource information portions to be transmitted using a fifth generation wireless network communication protocol.

In another example, the respective mobile virtual network operator networks can use common radio resources to provide wireless connectivity to respective subscribers of the respective mobile virtual network operator networks.

Referring initially to FIG. 1, illustrated is an example, non-limiting, system 100 for facilitating radio access resource sharing and intelligent dynamic carrier capacity division in accordance with one or more embodiments described herein. The various aspects discussed herein can facilitate improved coverage and radio access resource sharing in a wireless communications system.

The system 100 can comprise a network device 102, which can include at least one device associated with a radio resource provider. As used herein, the term "network device 102" can be interchangeable with (or can include) a network, a network controller, or any number of other network components. According to some implementations, the network device 102 can be associated with a base station and multiple mobile networks can access radio resources of the base station. The multiple mobile networks are illustrated as a first radio network device 104, a second radio network device 106, through an Nth radio network device 108, where N is an integer equal to or greater than zero. For example, there can be two or more radio network devices that can access radio resources of the base station (e.g., the network device 102). According to some implementations, the multiple mobile networks can be public land mobile networks (PLMNs).

By way of example, according to the ever-changing industry definition of a "carrier network," the biggest obstacle of a new carrier or a new provider (e.g., a mobile network, a PLMN) that desires to enter the carrier domain is the base station infrastructure. For example, the ability to cover a large foot print of population is not only extremely expensive and time consuming, the regulatory bodies associated the respective government authorities can establish strict rules on new carrier entry into the market.

An access network that utilizes 5G technology or a 5G protocol (e.g., a 5G access network) can consist of multiple radio technologies. In these multiple radio technologies, higher/macro 5G next generation radio as a layer can utilize a level of radio technologies as an enhancing layer for increasing different features of radio access network. For example, the level of radio technologies utilized can be comparable to a pico level radio technology (e.g., pico cell, Wi-Fi, millimeter wave (mmW), and so on).

If a new carrier (or a major service provider) can lease a portion of the frequency covering the major population/market and utilize its own name on the given leased resource as if it were their own network, it can provide opportunities for both the new carrier and the resource provider (e.g., base carrier) and the new mobile virtual network operators (MV-NO's).

In various access networks, there can be multiple PLMNs from a same base station. Therefore, a new carrier can use the same radio resources to furnish access to its subscribers as if it were their own network. However, when the number of new operators increases, depending of the type of services that the subscriber uses and/or that are offered by the secondary PLMN, there can be an impact on the overall performance of the access network. In some cases, the increase can skew the resource distribution amongst all the users.

There is also the aspect of premier users and emergency situations where there can be a reason to provide priority to certain PLMNs, customers, and/or services. The various aspects can implement this scaling dynamically such that diversion of a subset of resources can be automatically allocated to the priority entity (e.g., PLMN, customer, service) during the priority communication. This can provide a dynamic flexibility and reusability of the one or more carrier networks (e.g., slices) from the one or more layers.

As illustrated the network device 102 can comprise an assignment component 110, an indicator component 112, a communication component 114, one or more memories 116, and one or more processors 118. The assignment component 110 can designate first portions of a radio resource to the first radio network device 104. Further, the assignment component 110 can designate second portions of the radio resource to the second radio network device 106. In addition, the assignment component 110 can designate Nth portions of the radio resource to the Nth radio network device 108. The radio resources can comprise respective physical layer sections and respective medium access layer sections. According to some implementations, the first portions, the second portions, and the Nth portions of the radio resource can comprise medium access layer information.

The indicator component 112 can provide an indication in a header of the physical layer section that the first portions are for the first radio network device 104 and that the second portions of the radio resource are for the second radio network device 106. Further, the indicator component 112 can provide an indication in a header of the physical layer section that the Nth portions are for the Nth radio network device 108. The communication component 114 can transmit the radio resource to the first radio network device 104, the second radio network device 106, and the Nth radio network device 108. According to an implementation, transmitting the radio resource to the first radio network device 104, the second radio network device 106, and the Nth radio network device 108 can comprise transmitting the radio resource according to a fifth generation wireless network communication protocol.

The first radio network device 104 can receive the first portions and can ignore (e.g., does not receive or does not decode) the second portions and the Nth portions. Further, the second radio network device 106 can receive the second portions and can ignore (e.g., does not receive or does not decode) the first portions and the Nth portions. In addition, the Nth radio network device 108 can receive the Nth portions and can ignore (e.g., does not receive or does not decode) the first portions and the second portions.

For example, the radio network devices can receive the portions through respective communication modules $120_1$, $120_2$, and $120_N$. Thus, the communication module $120_1$ can be configured to decode the first portions, but cannot decode the second portions and the Nth portions. Further, the communication module $120_2$ can be configured to decode the second portions, but cannot decode the first portions and the Nth portions. In addition, the communication module $120_N$ can be configured to decode the Nth portions, but cannot decode the first portions and the second portions.

Further, the radio network devices can comprise respective memories $122_1$, $122_2$, and $122_N$ and respective processors $124_1$, $124_2$, and $124_N$. The respective one or more memories 116, $122_1$, $122_2$, and $122_N$ can be communicatively coupled to the one or more processors 118, $124_1$, $124_2$, and $124_N$. The respective one or more memories 116, $122_1$, $122_2$, and $122_N$ can store protocols associated with facilitating radio resource sharing as discussed herein. Further, the respective one or more memories 116, $122_1$, $122_2$, and $122_N$ can facilitate action to control communication between the network device 102, the first radio network device 104, the second radio network device 106, and the Nth radio network device 108, such that the system 100 can employ stored protocols and/or algorithms to achieve improved communications and radio resource sharing in a wireless network as described herein.

It should be appreciated that data store components (e.g., memories) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 118, 124$_1$, 124$_2$, and 124$_N$ can facilitate radio resource sharing in a communication network. The processors 118, 124$_1$, 124$_2$, and 124$_N$ can be processors dedicated to analyzing and/or generating information received, processors that control one or more components of the system 100, and/or processors that both analyze and generate information received and control one or more components of the system 100.

Figure 2:
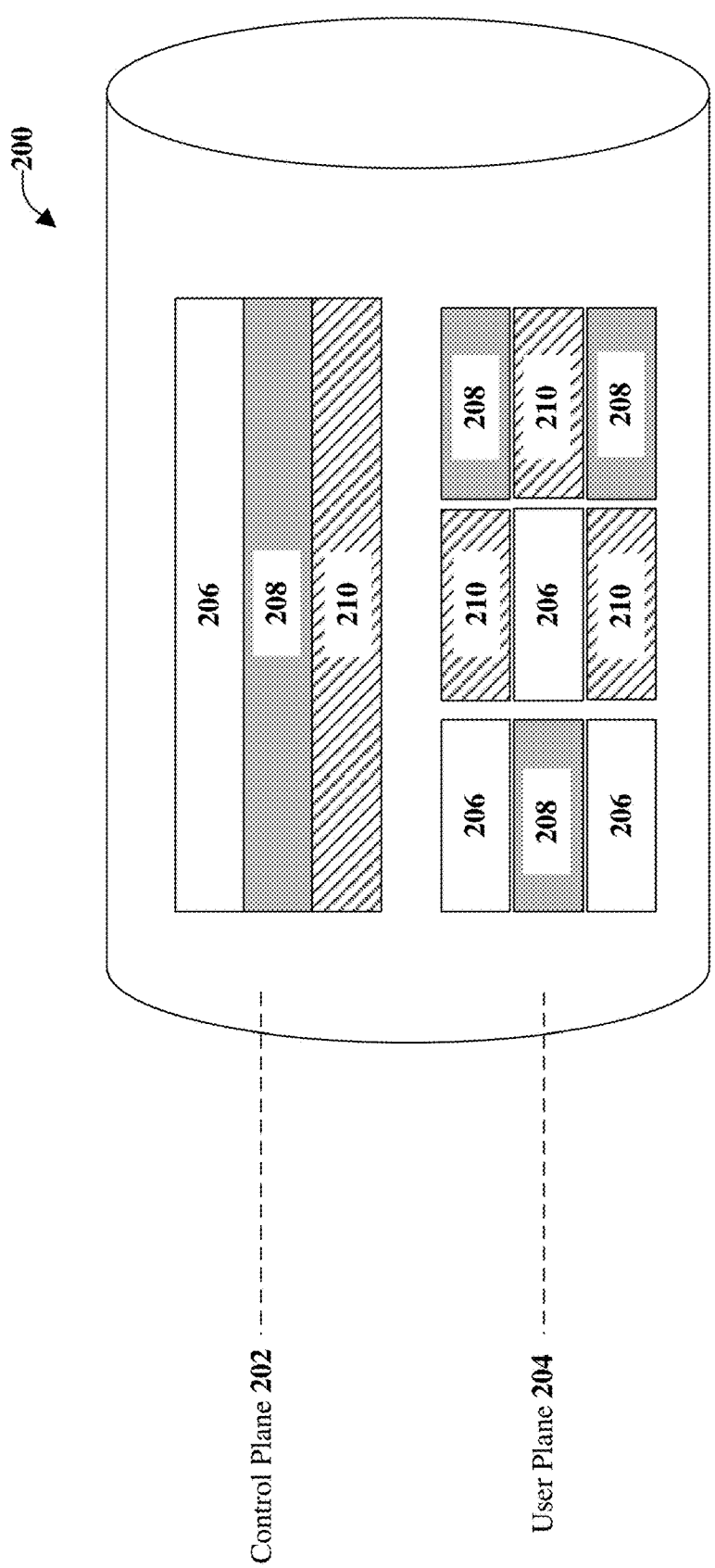
FIG. 2 illustrates an example, non-limiting, schematic representation of an access communication resource in accordance with one or more embodiments described herein.

By way of example and not limitation, FIG. 2 illustrates an example, non-limiting, schematic representation of an access communication resource 200 in accordance with one or more embodiments described herein. Repetitive description of like elements employed in other embodiments described herein is omitted for sake of brevity.

In a 5G network, the one or more access communication resources can comprise a control plane 202 and a user plane 204. The control plane 202 is responsible for setting up the communication path, starting a session, paging location updates, setting Quality of Service (QoS), and other functionalities. The user plane 204 is responsible for carrying the user related communication end to end. The user related communication can include, but is not limited to, video data, voice, and streaming videos.

As illustrated the control plane 202 can be divided into slices or carrier networks. In this example, the control plane 202 comprises a first slice 206, a second slice 208, and a third slice 210. However, in accordance with some implementations, the control plane 202 can be divided into fewer or more than three slices.

Also, as illustrated, respective portions of the user plane 204 can be allocated to the one or more slices. For example, a first set of resources can be allocated for the first slice 206, a second set of resources can be allocated for the second slice 208, and a third set of resources can be allocated for the third slice 210. It is noted that although FIG. 2 illustrates equal portions of the user plane 204 allocated to the different slices, the disclosed aspects are not limited to this implementation. For example, in some implementations, an unequal number of resources can be allocated for one or more slices. Further, the allocation of the resources can be dynamically scaled for one or more slices as discussed herein.

Figure 3:
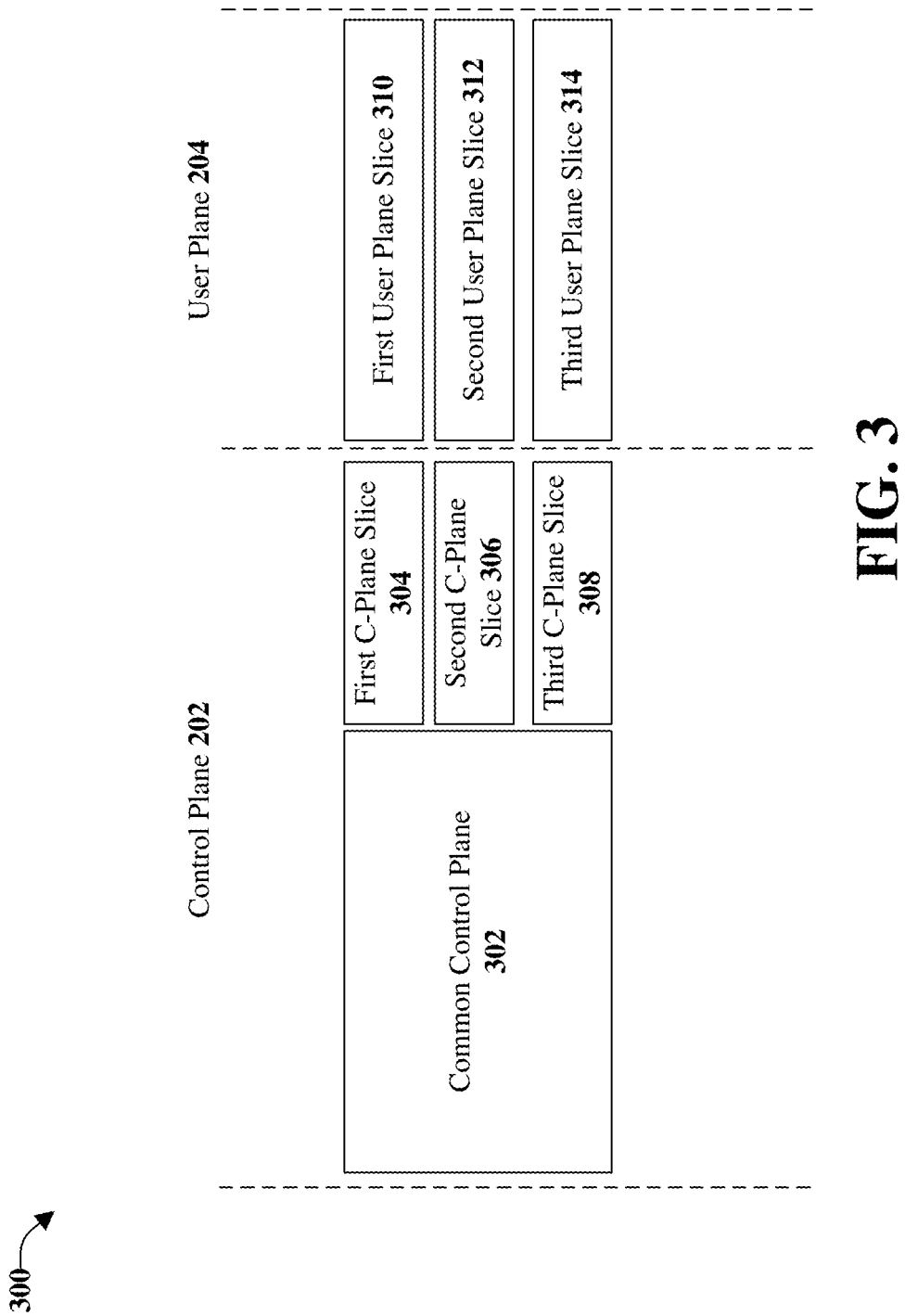
FIG. 3 illustrates an example, non-limiting, schematic representation of allocation of a control plane and a user plane in accordance with one or more embodiments described herein.

FIG. 3 illustrates an example, non-limiting, schematic representation 300 of allocation of the control plane 202 and the user plane 204 in accordance with one or more embodiments described herein. Repetitive description of like elements employed in other embodiments described herein is omitted for sake of brevity.

There are several ways to allocate the control plane 202 and the user plane 204. One option (not shown) is to have a common control plane across all slices and a dedicated user plane for the one or more slices. Another option (not shown) is for the one or more slices to have respective dedicated user planes and dedicated control planes. This option, however, can have a high cost since the control plane is always on (e.g., is always active).

Another option, as illustrated in FIG. 3, is that the one or more slices can have respective combinations of a common control plane and dedicated control planes. Further, the one or more slices can have respective dedicated user planes. This option allows for an always on common control plane and tailored control plane slice-specific control planes.

For example, a common control plane 302 can accommodate a common functionality management such as location update, paging, and other common radio related functionalities. The common control plane 302 can be received by the one or more radio network devices. The dedicated control planes for the one or more slices (e.g., the first slice 206, the second slice 208, and the third slice 210) are illustrated as a first control plane slice 304, a second control plane slice 306, and a third control plane slice 308. According to some implementations, the first control plane slice 304, the second control plane slice 306, and the third control plane slice 308 can have control over selective handover, setting up the bearer with given QoS and polices for the respective slice (e.g., the first slice 206, the second slice 208, and the third slice 210) and/or other unique slice related functionalities.

Also illustrated are the dedicated user planes for the user plane 204 (e.g., the first slice 206, the second slice 208, and the third slice 210). Specifically, illustrated are a first user plane slice 310, a second user plane slice 312, and a third user plane slice 314. Thus, by way of example and not limitation, a first network device (e.g., the first radio network device 104) can receive data over the common control plane 302, the first control plane slice 304, and the first user plane slice 310. A second network device (e.g., the second radio network device 106) can receive data over the common control plane 302, the second control plane slice 306, and the second user plane slice 312. Further, a third network device (e.g., the Nth radio network device 108) can receive data over the common control plane 302, the third control plane slice 308, and the third user plane slice 314.

Figure 4:
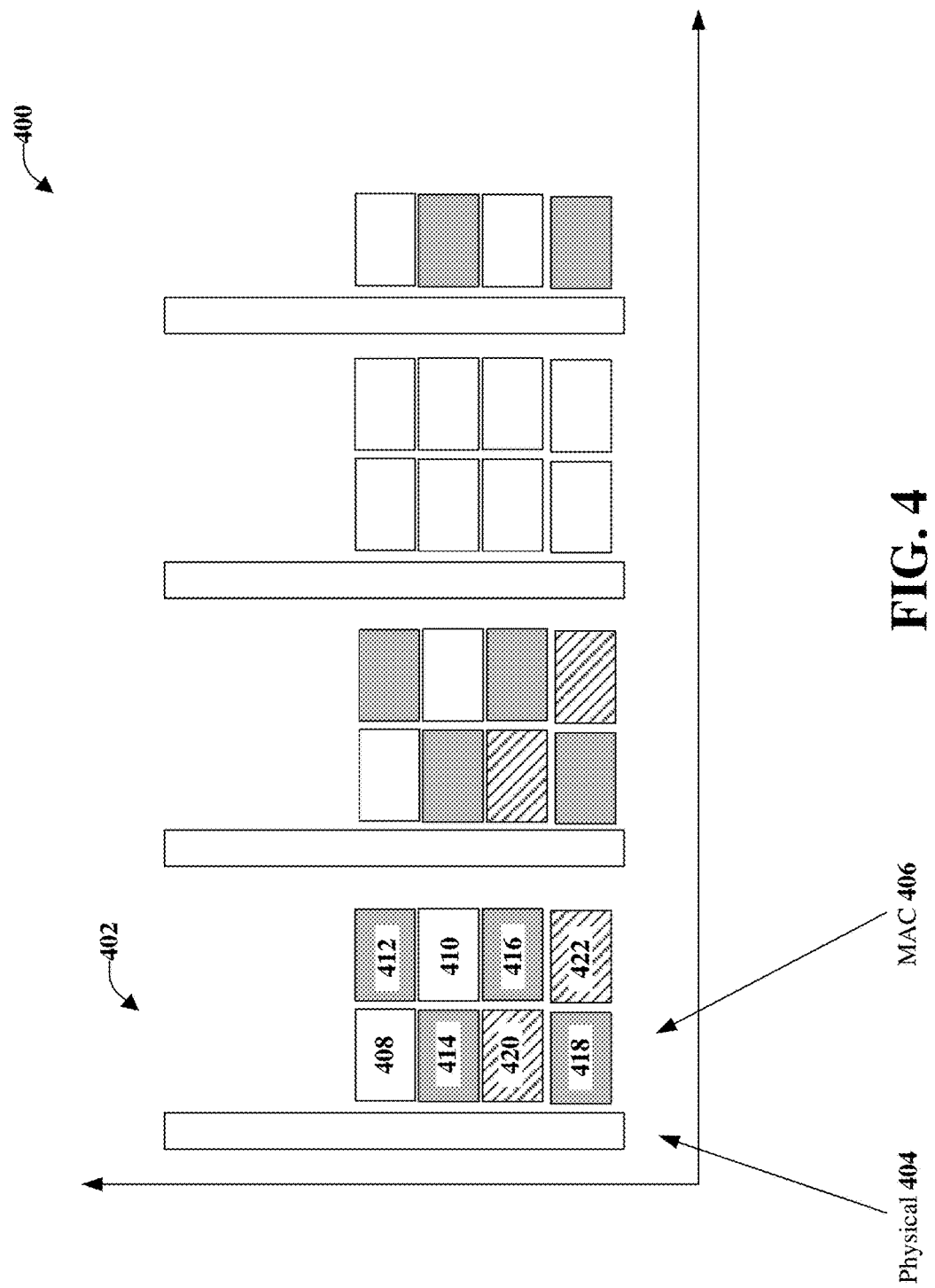
FIG. 4 illustrates an example, non-limiting, schematic representation of radio resources in accordance with one or more embodiments described herein.

FIG. 4 illustrates an example, non-limiting schematic representation of radio resources 400 in accordance with one or more embodiments described herein. Repetitive description of like elements employed in other embodiments described herein is omitted for sake of brevity.

As illustrated, the one or more radio resources can comprise respective physical components and respective medium access components. For example, as illustrated a first radio resource 402 can comprise physical layer information 404 and medium access layer information 406. The other radio resources can comprise similar elements and functionality and, therefore, will not be discussed separately herein for purposes of simplicity.

The physical layer information 404 can indicate what kind of medium access layer information is being transmitted. The medium access layer information 406 can comprise one or more portions of medium access layer information (represented by the boxes). Respective medium access layer information can be defined towards a slice (or a carrier network). For example, a first medium access layer information 408 (e.g., MAC) and a second medium access layer information 410 can be for a first network device (e.g., the first radio network device 104). Further to this example, a third medium access layer information 412, a fourth medium access layer information 414, a fifth medium access layer information 416, and a sixth medium access layer information 418 can be for a second network device (e.g., the second radio network device 106). Further to this example, a seventh medium access layer information 420 and an eighth medium access layer information 422 can be for a third network device (e.g., the Nth radio network device 108).

Figure 5:
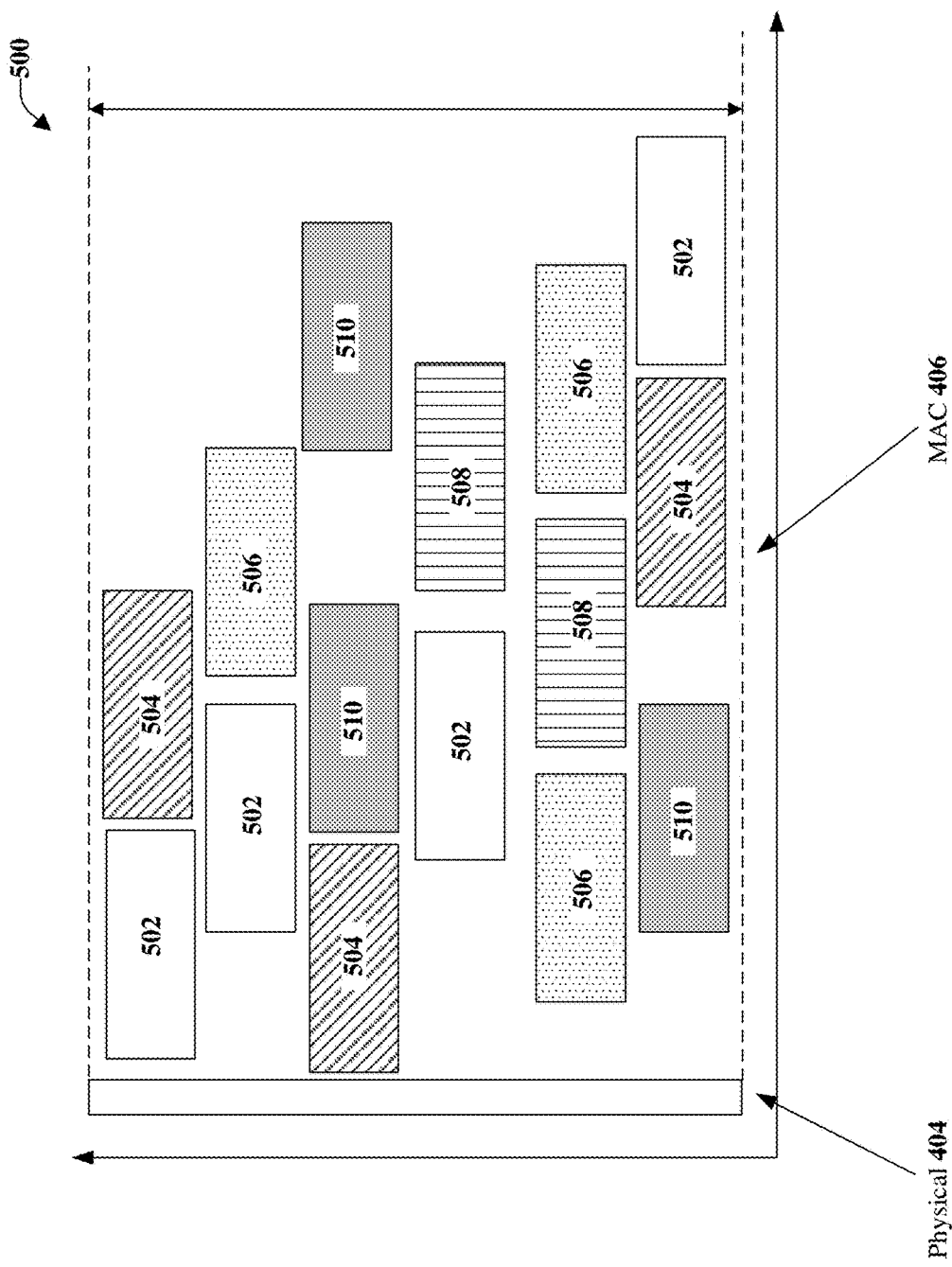
FIG. 5 illustrates an example, non-limiting, schematic representation of transmission of radio resource information in accordance with one or more embodiments described herein.

FIG. 5 illustrates an example, non-limiting, schematic representation 500 of transmission of the radio resource information in accordance with one or more embodiments described herein. Repetitive description of like elements employed in other embodiments described herein is omitted for sake of brevity.

When information is transmitted, the system 100 can read the physical layer information 404. The system 100 can determine to which slice/mobile network device (e.g., mobile network device) the information belongs. Accordingly, different mobile network device (e.g., PLMN) data can be added to the one or more radio resources (e.g., MAC 1, MAC 2, and so on). The percentage of data that the different mobile network device data can occupy within the package can also be indicated in the physical layer information 404. Therefore, the system can read the respective physical layer headers to determine where to start with the one or more MACs and divert the data to the correct slice/mobile network device/PLMN. Therefore, in accordance with the various aspects provided herein, the percentage of resources the one or more slices/mobile network device/PLMN can use for their subscribers can be dynamically assigned and changed (e.g., scalable).

According to some implementations, a slice pairing function between radio resource slices and Internet of Things (IoT) related slices can be performed in accordance with the aspects discussed herein. In addition, the one or more slices can have respective Virtual Network Function Placement (VNF-P), which can be chosen by the PLMNs that they are broadcasting. According to an example, the VNF-P can be a Mobility Management Entity (MME).

As an example, the medium access layer information 406 can be divided into multiple slices. In FIG. 5 there are five different slices that are divided between a first mobile network device 502, a second mobile network device 504, a third mobile network device 506, a fourth mobile network device 508, and a fifth mobile network device 510. As illustrated, different portions of the medium access layer information 406 are designated for the different mobile network devices.

Figure 6:
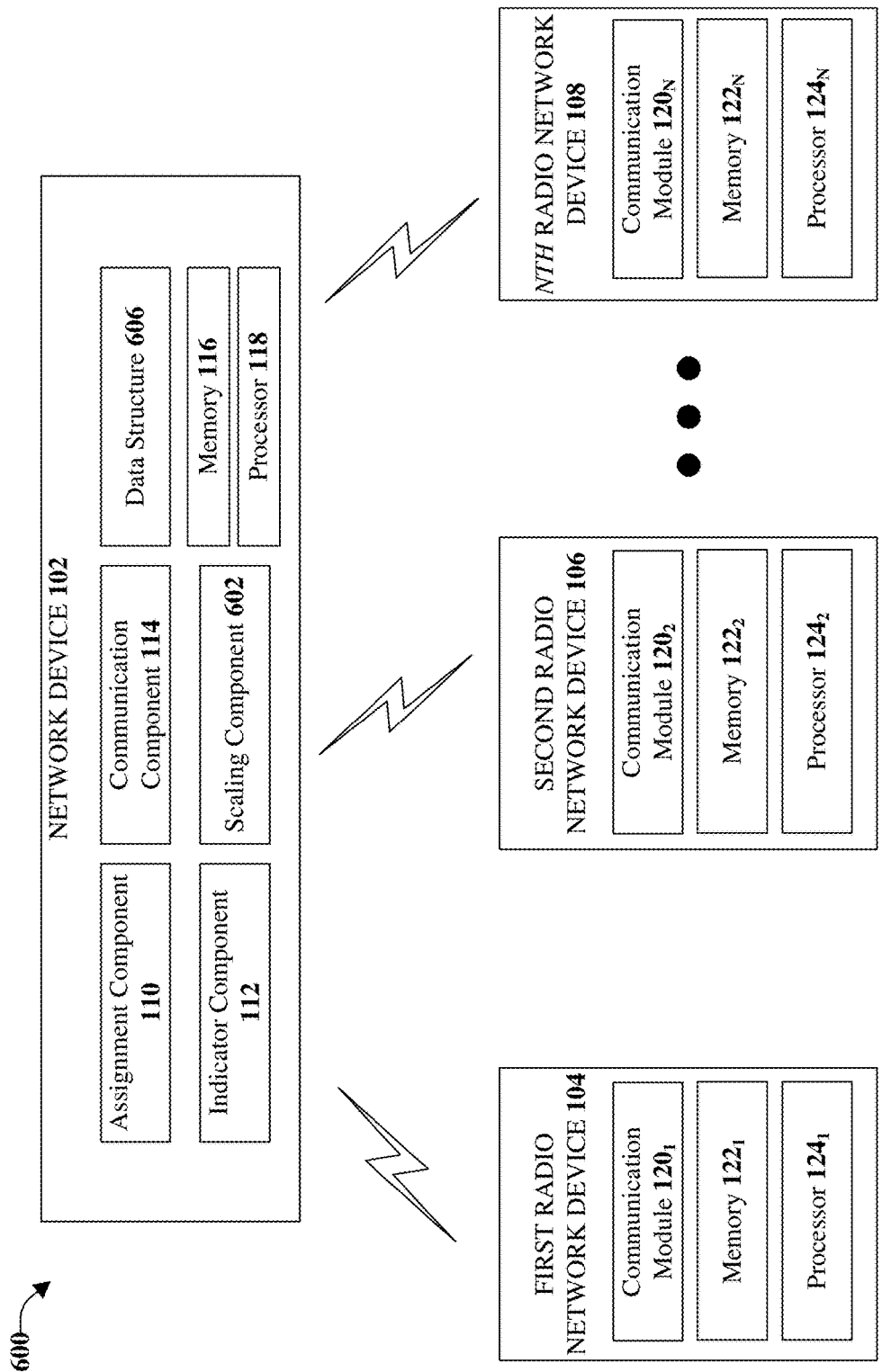
FIG. 6 illustrates an example, non-limiting, system for scaling of radio resources in a resource sharing environment in accordance with one or more embodiments described herein.

FIG. 6 illustrates an example, non-limiting, system 600 for scaling of radio resources in a resource sharing environment in accordance with one or more embodiments described herein. Repetitive description of like elements employed in other embodiments described herein is omitted for sake of brevity.

The system 600 can comprise one or more of the components and/or functionality of the system 100 and vice versa. The assignment component 110 can assign a first group of medium access layer information segments to the first radio network device 104, a second group of medium access layer information segments to the second radio network device 106, and subsequent groups of medium access layer information segments to subsequent network devices (e.g., Nth groups of medium access layer information segments to the Nth radio network device 108).

The indicator component 112 can update a header of the physical layer to indicate first segments in the first group of medium access layer information segments are for the first radio network device 104, second segments in the second group of medium access layer information segments are for the second radio network device 106, and that Nth segments in the subsequent groups of medium access layer information segments are for the Nth radio network device 108.

Further, the communication component 114 can facilitate a transmission of the radio resource to the first radio network device 104, the second radio network device 106, and the Nth radio network device 108. The transmission can comprise the first group of medium access layer information segments, the second group of medium access layer information segments, the subsequent groups of medium access layer information segments, and the physical layer.

According to some implementations, the network device 102 can comprise a scaling component 602 that can determine whether one or more additional resources should be assigned to one or more radio network devices. For example, there can be spare (or available) resources that can be assigned to a radio network device that can utilize the additional radio resources. In another example, one or more resources, which are not being used by a radio network device to which they are currently assigned can be, at least temporarily, assigned to another radio network device that can utilize the additional radio resources.

Alternatively, or additionally, the scaling component 602 can determine whether one or more fewer resource should be assigned to one or more radio network devices. In an example, the resources can be allocated to another radio network device. In another example, the resources can be allocated as spare (or available) resources that can be assigned to radio network devices in an "as needed" basis.

According to some implementations, the scaling component 602 can instruct the assignment component 110 to designate the first portions and the second portions based on a function of whether one or more radio network device should be assigned, at least temporarily, more radio resources or less radio resources. Thus, a first quantity of first portions can be individually scaled to the first radio network device and a second quantity of second portions can be individually scaled to the second radio network device.

In an example, the scaling component 602 can increase the first quantity of first portions designated for the first radio network device based on a determination that the first radio network device has priority over the second radio network device. Further to this example, the scaling component 602 can decrease the second quantity of second portions designated for the second radio network device based on the determination that the first radio network device has priority over the second radio network device.

The determination by the scaling component 602 as to how to allocate additional (or fewer) radio resources can be based on a function that can evaluate the respective radio resource usage. Based on the function, the scaling component 602 can assign (or de-assign) the radio resources. For example, the function can be utilized by the scaling component 602 to determine that a certain quantity of radio resources should be assigned (or de-assigned) to one or more radio network devices. In another example, the function can be utilized by the scaling component 602 to determine that a certain percentage of radio resources should be assigned (or de-assigned) to one or more radio network devices. The function can be based on a determination that one or more radio network devices are experiencing an emergency. In another example, the function can be based on a determination that one or more radio network devices, one or more customers of the one or more radio network devices, and/or one or more services offered by the one or more radio network devices (e.g., premium services) should be allocated additional radio resources (or should not be assigned additional radio resources).

According to some implementations, a data structure 604 can be maintained by the network device 102 to determine whether resources should be scaled for one or more of the radio network devices. According to an implementation, the data structure 604 can be a table or database. The data structure 604 can include information related to a mapping between a radio network device and the associated resources assigned to that radio network device. For example, the data structure 604 can retain information that a first set of radio resources are assigned to the first radio network device 104, a second set of radio resources are assigned to the second radio network device 106, and an Nth set of radio resources are assigned to the Nth radio network device 108. The data structure 604 can also include information related to unassigned radio resources, if any. For example, in some implementations, only a portion of the radio resources are assigned. The unassigned radio resources can be allocated to the radio network device on an "as needed" basis.

Figure 7:
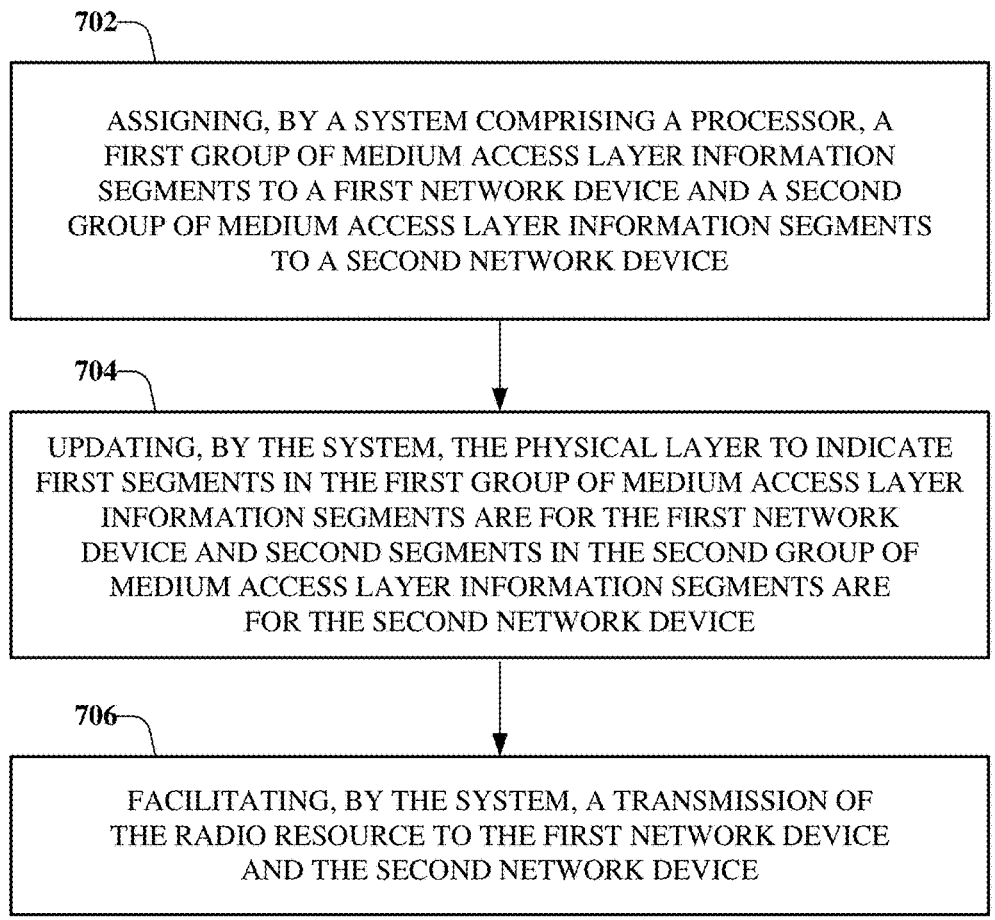
FIG. 7 illustrates an example, non-limiting, method for facilitating radio access resource sharing and intelligent dynamic carrier capacity division in accordance with one or more embodiments described herein.

FIG. 7 illustrates an example, non-limiting, method 700 for facilitating radio access resource sharing and intelligent dynamic carrier capacity division in accordance with one or more embodiments described herein. Repetitive description of like elements employed in other embodiments described herein is omitted for sake of brevity.

The method 700 can begin, at 702, with assigning, by a system comprising a processor, a first group of medium access layer information segments to a first network device and a second group of medium access layer information segments to a second network device (e.g., via the assignment component 110). The radio resource can comprise the first group of medium access layer information segments, the second group of medium access layer information segments, and a physical layer. According to some implementations, the radio resource can comprise more than two groups of medium access layer information segments.

According to an implementation, assigning the first group of medium access layer information segments and the second group of medium access layer information segments can comprise facilitating dynamic physical radio resource sharing in a wireless communications system. For example, multiple radio network devices can share the radio resources. Further, the radio resources can be individually scaled for the one or more radio network devices depending on respective conditions associated with the one or more radio network devices (e.g., emergency, premium services, and so on).

A header of the physical layer can be updated by the system, at 704, to indicate first segments in the first group of medium access layer information segments are for the first network device and second segments in the second group of medium access layer information segments are for the second network device (e.g., via the indicator component 112). According to some implementations, updating the header of the physical layer can comprise rendering the first group of medium access layer information segments decodable by the first network device and the second group of medium access layer information segments decodable by the second network device. For example, the first network device and the second network device can receive the full group of medium access layer information segments. However, the first network device can only decode the respective medium access layer information segments addressed for the first network device, the second network device can only decode the respective medium access layer information segments addressed for the second network device, and so on.

Further, at 706, the method 700 can include facilitating, by the system, a transmission of the radio resource to the first network device and the second network device (e.g., via the communication component 114). The transmission can comprise the first group of medium access layer information segments, the second group of medium access layer information segments, and the physical layer. According to some implementations, facilitating the transmission can comprise facilitating the transmission of the radio resource in accordance with a fifth generation wireless network communication protocol.

Figure 8:
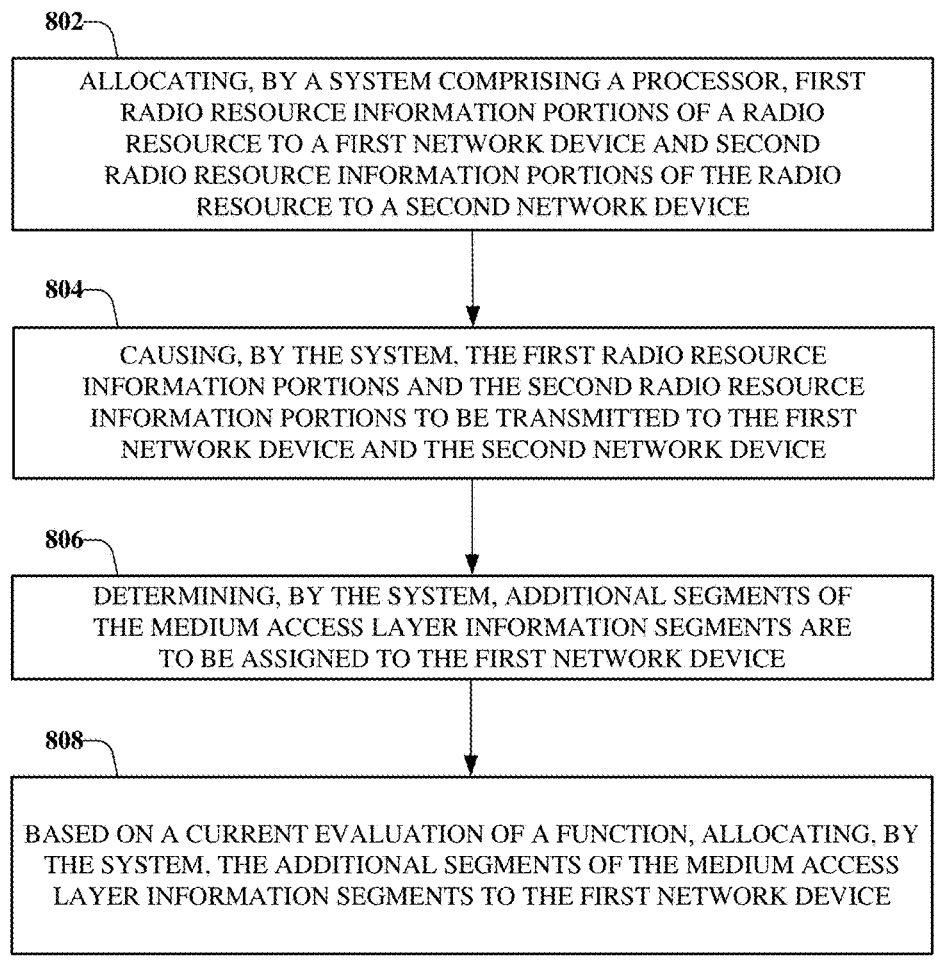
FIG. 8 illustrates an example, non-limiting, method for dynamically scaling radio access resources in a radio access resource sharing environment in accordance with one or more embodiments described herein.

FIG. 8 illustrates an example, non-limiting, method 800 for dynamically scaling radio access resources in a radio access resource sharing environment in accordance with one or more embodiments described herein. Repetitive description of like elements employed in other embodiments described herein is omitted for sake of brevity.

A system comprising a processor can allocate, at 802, first radio resource information portions of a radio resource to a first radio network device and second radio resource information portions of the radio resource to a second radio network device (e.g., via the assignment component 110). Further, third radio resource information portions of the radio resource can be allocated to a third radio network device, fourth radio resource information portions of the radio resource can be allocated to a fourth radio network device, and so on.

At 804, the system can cause the first radio resource information portions and the second radio resource information portions to be transmitted to the first radio network device and the second radio network device (e.g., via the communication component 114). Information related to a first allocation of the first radio resource information portions and a second allocation of the second radio resource information portions can be included in a header portion of a physical layer of the radio resource (e.g., via the indicator component 112).

According to some implementations, the first radio network device and the second radio network device can be associated with respective mobile virtual network operator networks. Further to these implementations, causing the first radio resource information portions and the second radio resource information portions to be transmitted can comprise causing the first radio resource information portions and the second radio resource information portions to be transmitted using a fifth generation wireless network communication protocol. Further, to these implementations, the respective mobile virtual network operator networks can use common radio resources to provide wireless connectivity to respective subscribers of the respective mobile virtual network operator networks.

According to some implementations, a first number of segments in the first group of medium access layer information segments and a second number of segments in the second group of medium access layer information segments can be changeable based on parameters associated with the first radio network device and the second radio network device. For example, a parameter can be an emergency where consumption of radio resources by the first radio network device has increased dramatically and/or quickly. In another example, a parameter can be premium services and at least a temporary (or a permanent) demand for the premium services. In some implementations, two or more radio network devices can demand more radio resources and such resources can be scaled for the two or more radio network devices, while still providing resources to the other radio network devices.

Accordingly, at 806, the method 800 can include determining, by the system, additional segments of the medium access layer information segments are to be assigned to the first radio network device (e.g., via the scaling component 602). For example, the first radio network device could request more radio resources to handle an emergency in the local environment. In another example, the first radio network device could have an increase in the amount of premium services for which its subscribers have purchased (and demand) According to some implementations, the increase in the additional radio resources or segments can be automatically detected based on a corresponding consumption of radio resources by a radio network device (e.g., the first radio network device 104).

Based on the determination that additional segments are to be assigned to the first network device and based on a current evaluation of a function, at 808, the system can allocate the additional segments of the medium access layer information segments to the first network device (e.g., via the indicator component 112). In an example, allocating the additional segments can comprise updating the header of the physical layer to indicate the additional segments are for the first radio network device.

According to some implementations, the additional segments can be unused segments. However, according to other implementations, the additional segments can be segments that were assigned to another radio network device (e.g., the second radio network device), but which are not needed by the other radio network device. If the other radio network device has an increased demand for the radio resources, additional radio resources can be allocated for that radio network device.

Described herein are systems, methods, articles of manufacture, and other embodiments or implementations that can facilitate radio access resource sharing and intelligent dynamic carrier capacity division in a 5G network. Facilitating radio access resource sharing and intelligent dynamic carrier capacity division in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

As used herein, "5G" can also be referred to as New Radio (NR) access. Accordingly, systems, methods, and/or machine-readable storage media for facilitating improved communication coverage and/or machine to machine communication solutions for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
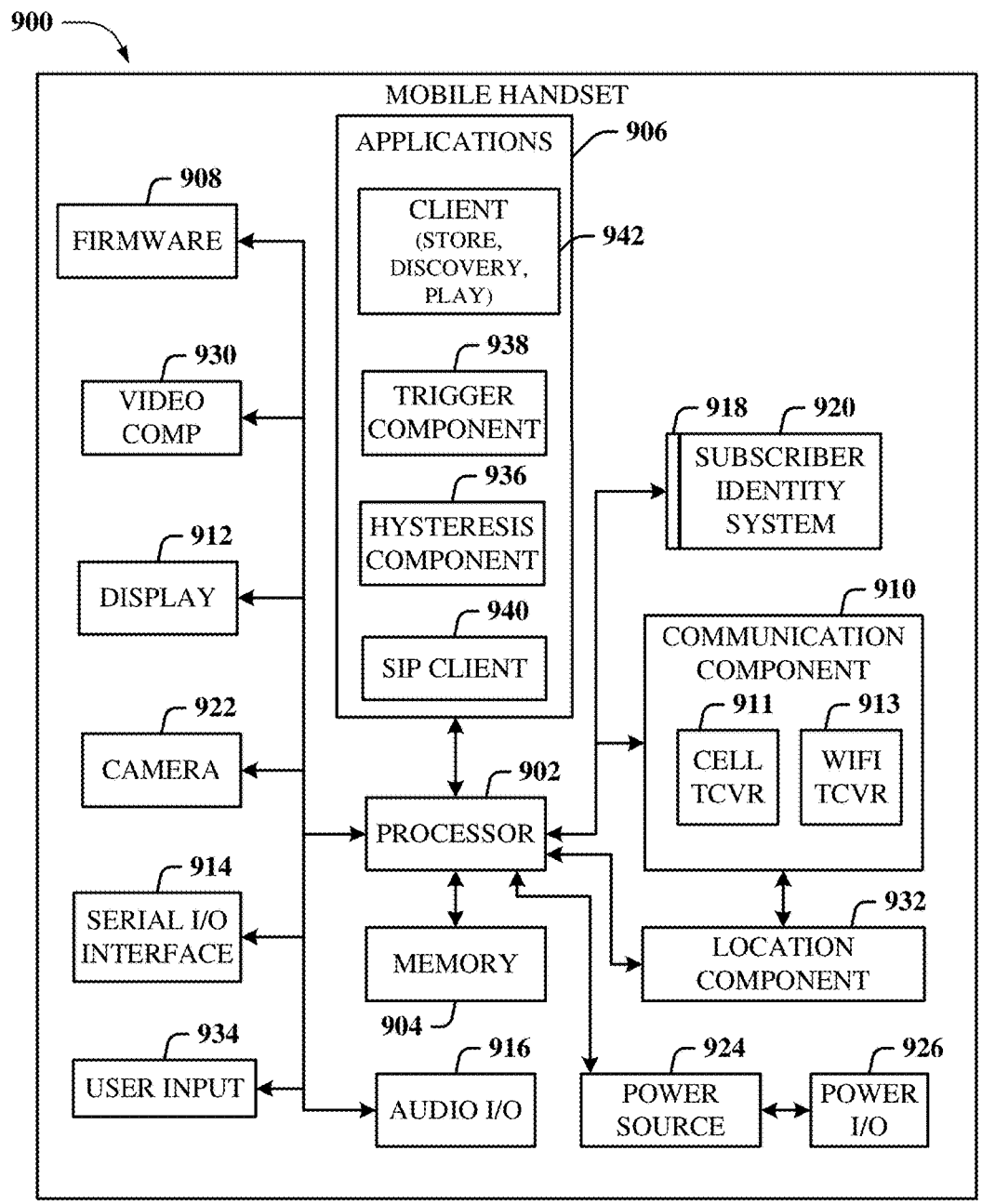
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
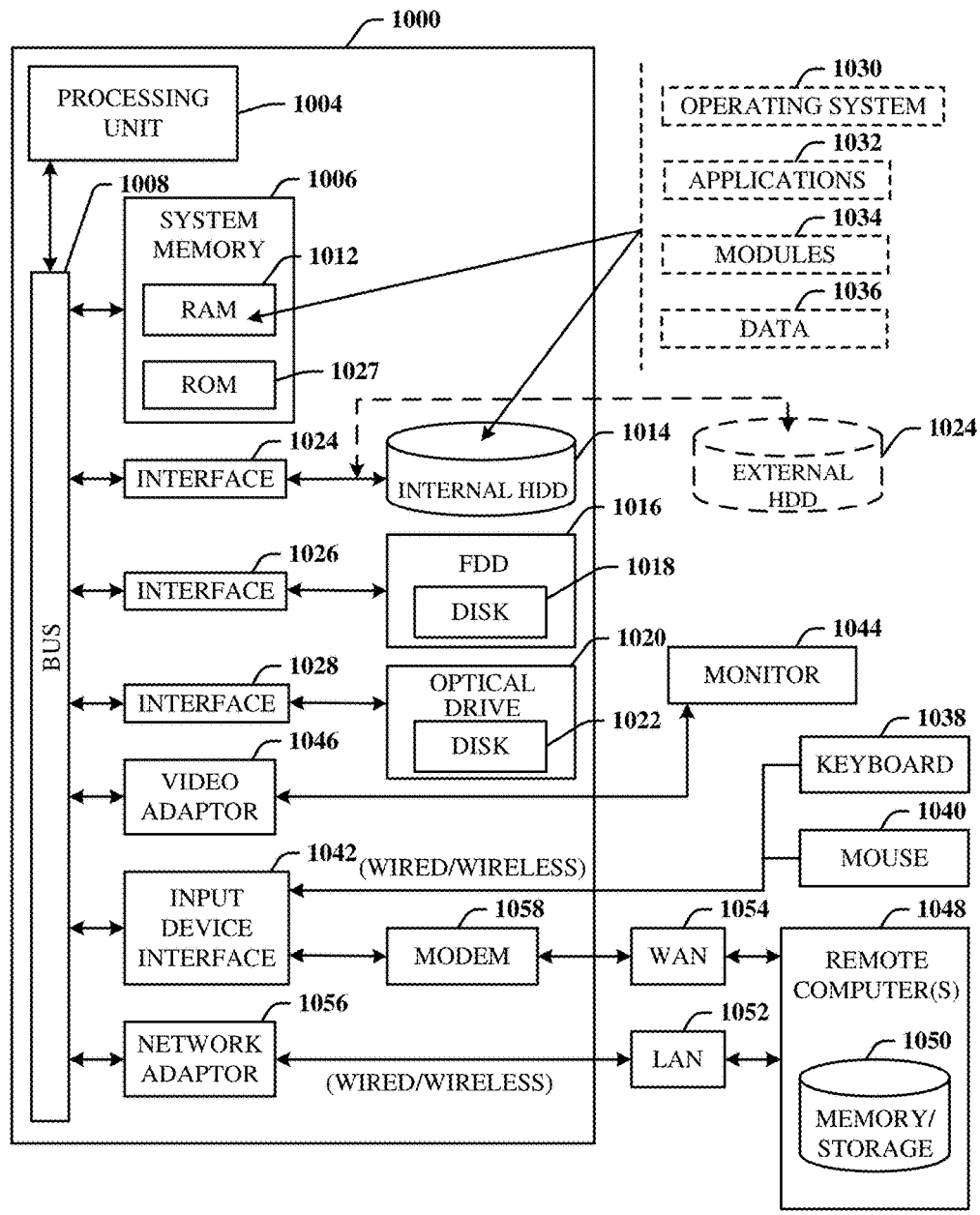
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a machine to machine communication solutions for 5G systems are provided herein. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
designating first portions of a radio resource to a first radio network device assigned to a first carrier network and second portions of the radio resource to a second radio network device assigned to a second carrier network, wherein the radio resource comprises a physical layer section and a medium access layer section;
indicating in a header of the physical layer section that the first portions are for the first radio network device and that the second portions of the radio resource are for the second radio network device; and
transmitting the radio resource to the first radio network device and the second radio network device, wherein the first radio network device receives the first portions and does not receive the second portions, and wherein the second radio network device receives the second portions and does not receive the first portions.

2. The system of claim 1, wherein the designating the first portions and the second portions comprise, based on a function, scaling a first quantity of first portions to the first radio network device and a second quantity of second portions to the second radio network device.

3. The system of claim 2, wherein the scaling the first quantity of first portions comprises increasing the first quantity of first portions designated for the first radio network device based on a determination that the first radio network device has priority over the second radio network device.

4. The system of claim 3, wherein the operations further comprise decreasing the second quantity of second portions designated for the second radio network device based on the determination that the first radio network device has priority over the second radio network device.

5. The system of claim 1, wherein the first portions and the second portions of the radio resource comprise medium access layer information.

6. The system of claim 1, the operations further comprise:
diverting the first portions to the first radio network device and the second portions to the second radio network device based on a reading of the header of the physical layer section.

7. The system of claim 1, wherein the first radio network device is associated with a first public land mobile network and the second radio network device is associated with a second public land mobile network.

8. The system of claim 7, wherein the first public land mobile network and the second public land mobile network use common radio resources to provide wireless connectivity to subscribers of the first public land mobile network and the second public land mobile network.

9. The system of claim 1, wherein the designating the first portions and the second portions of the radio resource comprises facilitating physical radio resource sharing in a wireless communications system.

10. The system of claim 1, wherein the transmitting the radio resource to the first radio network device and the second radio network device comprises transmitting the radio resource according to a fifth generation wireless network communication protocol.

11. A method, comprising:
assigning, by a system comprising a processor, a first group of medium access layer information segments to a first network device of a first carrier network and a second group of medium access layer information segments to a second network device of a second carrier network, wherein a radio resource comprises the first group of medium access layer information segments, the second group of medium access layer information segments, and a physical layer;
updating, by the system, a header of the physical layer to indicate first segments in the first group of medium access layer information segments are for the first network device and second segments in the second group of medium access layer information segments are for the second network device; and facilitating, by the system, a transmission of the radio resource to the first network device and the second network device, wherein the transmission comprises the first group of medium access layer information segments, the second group of medium access layer information segments, and the physical layer.

12. The method of claim 11, wherein the updating the header of the physical layer comprises rendering the first group of medium access layer information segments decodable by the first network device and the second group of medium access layer information segments decodable by the second network device.

13. The method of claim 11, wherein a first number of segments in the first group of medium access layer information segments and a second number of segments in the second group of medium access layer information segments are changeable based on parameters associated with the first network device and the second network device.

14. The method of claim 11, further comprising:
determining, by the system, additional segments of the medium access layer information segments are to be assigned to the first network device; and
based on a current evaluation of a function, allocating, by the system, the additional segments of the medium access layer information segments to the first network device.

15. The method of claim 14, wherein the allocating the additional segments comprises updating the header of the physical layer to indicate the additional segments are for the first network device.

16. The method of claim 11, wherein the assigning the first group of medium access layer information segments and the second group of medium access layer information segments comprises facilitating dynamic physical radio resource sharing in a wireless communications system.

17. The method of claim 11, wherein the facilitating the transmission comprises facilitating the transmission of the radio resource in accordance with a fifth generation wireless network communication protocol.

18. A non-transitory machine-readable storage medium, comprising executable instructions that, when executed by a processor, facilitate performance of operations, comprising:
allocating first radio resource information portions of a radio resource of a base station device to a first network device of a first carrier network and second radio resource information portions of the radio resource to a second network device of a second carrier network; and
causing the first radio resource information portions and the second radio resource information portions to be transmitted to the first network device and the second network device, wherein information related to a first allocation of the first radio resource information portions and a second allocation of the second radio resource information portions are included in a header portion of a physical layer of the radio resource.

19. The non-transitory machine-readable storage medium of claim 18, wherein the first network device and the second network device are associated with respective mobile virtual network operator networks, and wherein the causing the first radio resource information portions and the second radio resource information portions to be transmitted comprises causing the first radio resource information portions and the second radio resource information portions to be transmitted using a fifth generation wireless network communication protocol.

20. The non-transitory machine-readable storage medium of claim 19, wherein the respective mobile virtual network operator networks use common radio resources to provide wireless connectivity to respective subscribers of the respective mobile virtual network operator networks.

* * * * *